United States Patent
Razvan et al.

Patent Number: 5,356,982
Date of Patent: Oct. 18, 1994

[54] BASIC CALCIUM ALUMINUM HYDROXY PHOSPHITES, A PROCESS FOR THEIR PRODUCTION AND THEIR USE

[75] Inventors: Coriolan Razvan, Karlsfeld; Reinhard Beck, Munich; Alfred Kürzinger, Karlsfeld; Michael Rosenthal; Albert W. Pürzer, both of Munich, all of Fed. Rep. of Germany

[73] Assignee: Bärlocher GmbH, Fed. Rep. of Germany

[21] Appl. No.: 98,308

[22] PCT Filed: Feb. 21, 1992

[86] PCT No.: PCT/DE92/00144

§ 371 Date: Aug. 6, 1993

§ 102(e) Date: Aug. 6, 1993

[87] PCT Pub. No.: WO92/15523

PCT Pub. Date: Sep. 17, 1992

[30] Foreign Application Priority Data

Feb. 28, 1991 [DE] Fed. Rep. of Germany ....... 4106411

[51] Int. Cl.$^5$ .......................... C01B 25/45; C08K 3/32
[52] U.S. Cl. ...................... 524/414; 423/306
[58] Field of Search .................. 423/306; 524/414

[56] References Cited

U.S. PATENT DOCUMENTS 4,883,533 11/1989 Kosin et al. .
5,298,545 3/1994 Razvan et al. ............... 423/306

FOREIGN PATENT DOCUMENTS 0040364 11/1981 European Pat. Off. .
0139931  5/1985 European Pat. Off. .
0256872  2/1988 European Pat. Off. .
1523531  8/1988 United Kingdom .

*Primary Examiner*—Wayne Langel
*Attorney, Agent, or Firm*—Scully, Scott, Murphy & Presser

[57] ABSTRACT

The invention describes basic calcium aluminum hydroxy phosphites of the general formula $$Ca_xAl_2(OH)_{2(x+3-y)}(HPO_3)_y \cdot mH_2O$$

wherein
x=2–12, $$\frac{2x+5}{2} > y > 0$$

and
m=0–12, with the proviso that y≠1, if x=2–8.

The compounds according to the invention are particularly suited as stabilizers for halogen-containing polymers, in particular PVC.

8 Claims, No Drawings

BASIC CALCIUM ALUMINUM HYDROXY PHOSPHITES, A PROCESS FOR THEIR PRODUCTION AND THEIR USE

The invention relates to basic calcium aluminum hydroxy phosphites, a process for their production and their use as stabilizers for halogen-containing polymers, in particular polyvinyl chloride.

Halogen-containing thermoplastic resin compositions or shaped articles produced therefrom are decomposed by the influence of heat or light. For this reason, stabilizers must be added to these resins. For especially demanding articles such as profiles, plates or pipes inorganic and/or organic compounds of toxic heavy metals such as lead, barium or cadmium are used. 2-basic lead phosphite achieved a special importance in the stabilization of e.g. rigid PVC articles where good thermal and good light and weather resistance are required. The use of basic lead phosphite as a stabilizer against the decomposition of PVC by heat, daylight and UV radiation is e.g. described in DD-PS 61 095. CH-PS 8 510 622 describes the stabilization of highly filled rigid and plasticized PVC products with a mixture of basic lead sulphate and lead phosphite. Another use of basic lead phosphite for PVC high-resistance foam mixtures is described in U.S. Pat. No. 4,797,426.

Since basic lead phosphite, like other heavy-metal-containing stabilizers, is classified as toxic, it has been attempted to find stabilizing alternatives. A great number of combinations of inorganic and organic compounds are known as stabilizers for halogen-containing thermoplastic resins. In JP-PS 1 213 865 and JP-OS 80 445/80 a hydrotalcite is suggested as a stabilizer. This substance is superior to mixtures of Ca/Zn metal soaps as regards heat stability and transparency. However, the problem of the discolouring of the resin during processing cannot be solved by the use of hydrotalcite. It is suggested according to JP-OS 80 444/82 to use combinations of hydrotalcite and 1,3-diketone compounds to overcome this problem. Moreover, hydrotalcites have the disadvantage that they split off water and carbon dioxide at the processing temperatures customary for PVC. It is suggested in EP-A- 0 256 872 to eliminate this disadvantage by adding very finely divided magnesium oxide.

DE-A- 39 41 902 (prior art within the purview of Section 3 II of the German Patent Act) describes basic calcium aluminum hydroxy phosphites of the formula

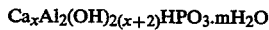

Ca$_x$Al$_2$(OH)$_{2(x+2)}$HPO$_3$.mH$_2$O wherein
x=2-8 and
m=0-12.
a process for their production and their use as stabilizers for halogen-containing polymers.

The invention is based on the object of providing new compounds and a process for their production, which are in particular suited as stabilizers for halogen-containing polymers without having the aforementioned disadvantages of the known stabilizers, and are in particular classified as non-toxic.

This object is attained according to the invention by the making available of basic calcium aluminum hydroxy phosphites of the general formula

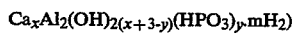

Ca$_x$Al$_2$(OH)$_{2(x+3-y)}$(HPO$_3$)$_y$.mH$_2$)

wherein x=2-12, $$\frac{2x+5}{2} > y > 0$$

and m=0-12, with the proviso that y≠1, if x=2-8.

x means preferably 2 to 8, especially preferred 3-6, and m means preferably 2-4 in the aforementioned formula.

Examinations by means of x-ray diffraction have shown that the compounds according to the invention do not belong to the hydrotalcite type as regards their crystal structure.

It became surprisingly apparent that the calcium aluminum hydroxy phosphites according to the invention impart halogen-containing thermoplastic resins and the shaped articles produced from them heat stabilities comparable to those imparted by basic lead phosphites. The compounds according to the invention prevent discolourings in the production of e.g. rigid shaped PVC articles, colour retention, and weather stability of the shaped articles stabilized with the compounds according to the invention are also equivalent to those of products stabilized with toxic heavy metal compounds.

The subject matter of the invention is also a process for the production of the calcium aluminum hydroxy phosphites according to the invention, which is characterized in that mixtures of calcium hydroxide and/or oxide, aluminum hydroxide and sodium hydroxide or of calcium hydroxide and/or oxide and sodium aluminate is reacted with phosphorous acid in amounts corresponding to the production of the desired compounds in an aqueous medium, and the reaction product is separated and recovered in a fashion known per se.

The reaction product directly obtained in the reaction described above can be separated from the aqueous medium according to known processes, preferably by means of filtration. The processing of the separated reaction product is also carried out in a manner known per se, e.g. by washing the filter cake with water and drying the washed residue at temperatures of e.g. 60° to 130° C., preferably at 90° to 120° C.

Both a finely divided, active aluminum hydroxide in combination with sodium hydroxide and a sodium aluminate can be used for the reaction. Calcium can be used in the form of finely divided calcium oxide or hydroxide or mixtures thereof. The phosphorous acid can be used in differently concentrated form.

The reaction temperatures range preferably between about 50° and 100° C., and with further preference between about 60° and 85° C. Catalysts or accelerators are not required. The water of crystallization can be wholly or partly removed by thermal treatment in the compounds according to the invention. When used as stabilizers, the dried calcium aluminum hydroxy phosphites according to the invention do not split off any water at the processing temperatures of 160° to 200° C. e.g. customary for rigid PVC so that no disturbing bubble formation occurs in the shaped parts.

To improve their dispersive power in halogen-containing thermoplastic resins the compounds according to the invention can be coated with surfactants in a manner known per se.

According to the invention halogen-containing thermoplastic resins can be stabilized with the calcium aluminum hydroxy phosphites according to the invention. Polyvinyl chlorides produced in suited fashion, homoand copolymers thereof and their mixtures with other polymers such as ABS (acrylonitrile/butadiene/styrene), CPVC (postchlorinated PVC), acrylates and the like are in particular suited for this.

In addition to the compounds according to the invention, further additives can of course be incorporated into the resin. Examples of such additives are organotin compounds, organic phosphites, epoxy compounds, amino compounds, polyhydric alcohols, metal soaps of $C_8$–$C_{22}$ fatty acids with metals such as Ca, Zn, Mg or Al, antioxidants, ultraviolet absorbers, carbonyl compounds, antistatic agents, lubricants, plasticizers, waxes, pigments and fillers.

The following examples explain the invention.

A) Production of the basic calcium aluminum hydroxy phosphites

EXAMPLE 1

An aqueous suspension (5.2 l) of 222 g of calcium hydroxide (3 mole), 80 g of sodium hydroxide (2 mole) and 156 g of active aluminum hydroxide (2 mole) is heated to 60° C. Subsequently, 157.7 g of phosphorous acid (1.5 mole) are added in the form of a 70% aqueous solution at a uniform feed speed with stirring and maintaining of the temperature in the course of 30 minutes. Thereupon the suspension is heated to 85° C. and kept at this temperature under stirring for 3 hours. 10 minutes prior to the end of the reaction time, 5 g of sodium stearate are added for coating. The suspension obtained in this fashion is filtered off, washed with 1.5 l of water, and the filter cake is dried in a drying cupboard at 115° C. for 3 hours.

The analysis values of the product produced in this fashion are indicted below.

| Molar ratio | Found value | Calculated value |
|---|---|---|
| Ca | 3.0 | 3.0 |
| Al | 1.9 | 2.0 |
| P | 0.4 | 0.5 |

EXAMPLE 2

An aqueous suspension (7.2 l) of 444 g of calcium hydroxide (6 mole) and 164 g of sodium aluminate (2 mole) is heated to 50° C. Subsequently, 351.5 g of phosphorous acid (3 mole) are added in the form of a 70% aqueous solution at a uniform feed speed in the course of 30 minutes with stirring and maintaining the temperature. Thereupon the suspension is heated to 85° C. and kept at this temperature under stirring for 3 hours. 10 minutes before the end of the reaction time 6 g of sodium stearate are added for coating. The suspension obtained in this fashion is filtered off, washed with 1.5 l of water and the filter cake is dried in a drying cupboard at 115° C. for 3 hours.

The analysis values of the product produced in this fashion are indicated below.

| Molar ratio | Found value | Calculated value |
|---|---|---|
| Ca | 6.0 | 6.0 |
| Al | 1.9 | 2.0 |
| P | 2.1 | 2.0 |

EXAMPLE 3

An aqueous suspension (8.4 l) of 592 g of calcium hydroxide (8 mole) and 164 g of sodium aluminate (2 mole) is heated to 50° C. Subsequently 878.6 g of phosphorous acid (7.5 mole) are added in the form of a 70% aqueous solution at a uniform feed speed in the course of 30 minutes with stirring and maintaining the temperature.

Thereupon the suspension is heated to 85° C. and kept at this temperature under stirring for 4 hours. 10 minutes before the end of the reaction time, 8 g of sodium stearate are added for coating. The suspension obtained in this fashion is filtered off, washed with 1.8 l of water, and the filter cake is dried in a drying cabinet at 115° C. for 3 hours.

The analysis values of the product obtained in this fashion are indicated below.

| Molar ratio | Found value | Calculated value |
|---|---|---|
| Ca | 8.0 | 8.0 |
| Al | 2.1 | 2.0 |
| P | 6.3 | 6.5 |

B) Use of the compounds according to the invention as stabilizers

The heat stability, the ultraviolet stability and the initial colour of shaped PVC bodies to which the compounds of the invention had been added are evaluated in the following examples.

For the evaluation of the heat stability the PVC resin composition is homogenized and plastified in a laboratory rolling mill at 180° for 5 minutes. Square sample sheets with an edge length of 15 mm are cut from the about 1 mm thick milled sheet produced in this fashion. These sample sheets are tempered in a drying oven at 180° C. At 10-minute intervals one sheet each is removed and affixed to a test card one after the other. This procedure is repeated until the sample sheets turned black.

Square pieces with an edge length of 40 mm are cut from a milled sheet produced as indicated above to evaluate the ultraviolet stability. Several of these pieces are stacked on a polished and chromium-plated steel plate, enclosed with a 2 mm thick metal frame and covered with an also polished and chromium-plated steel plate. Sample bodies of exactly defined thickness and smooth surface are thus produced in a heated press. These samples are exposed in a Xenotest device according to DIN 53388. The time which elapses until the sample has clearly changed its initial colour is determined. The longer this time is, the higher is the ultraviolet stability.

The initial colour was directly assessed in the aforementioned pressed shaped articles.

EXAMPLE 4

| | Parts by weight | | | | | | | |
|---|---|---|---|---|---|---|---|---|
| | A | B | C | D | E | F | G | H |
| PVC (K 68) | 100 | 100 | 100 | 100 | 100 | 100 | 100 | 100 |

-continued

| | Parts by weight | | | | | | | |
|---|---|---|---|---|---|---|---|---|
| | A | B | C | D | E | F | G | H |
| Impact modifier* | 7 | 7 | 7 | 7 | 7 | 7 | 7 | 7 |
| Chalk | 3 | 3 | 3 | 3 | 3 | 3 | 3 | 3 |
| $TiO_2$ | 4 | 4 | 4 | 4 | 4 | 4 | 4 | 4 |
| Stearyl stearate | 0.5 | 0.5 | 0.5 | 0.5 | 0.5 | 0.5 | 0.5 | 0.5 |
| Bisphenol A | 0.2 | 0.2 | 0.2 | 0.2 | 0.2 | 0.2 | 0.2 | 0.2 |
| Lead stearate | 0.8 | 0.8 | — | — | — | — | — | — |
| $2POPbHPO_3 \cdot 0.5H_2O$ | 2.5 | 3 | — | — | — | — | — | — |
| Zinc laurate | — | — | 0.6 | 0.6 | 0.6 | 0.6 | 0.6 | 0.6 |
| Calcium stearate | — | — | 0.5 | 0.5 | 0.5 | 0.5 | 0.5 | 0.5 |
| $Ca_3Al_2(OH)_{11}-(HPO_3)_{0.5}\cdot 3H_2O$ | — | — | 3.0 | 4.0 | — | — | — | — |
| $Ca_6Al_2(OH)_{14}-(HPO_3)_{2.0}\cdot 4H_2O$ | — | — | — | — | 3.0 | 4.0 | — | — |
| $Ca_8Al_2(OH)_9-(HPO_3)_{6.5}\cdot 3H_2O$ | — | — | — | — | — | — | 3.0 | 4.0 |

*Bärodur EST-3

The aforementioned compositions of A to H were produced and tested according to the indicated methods. The results are summarized in tables I and II.

TABLE I

Results of the evaluation of the thermal stability

| Composition | Time (min.) | | | | | | | | | | |
|---|---|---|---|---|---|---|---|---|---|---|---|
| | 0 | 10 | 20 | 30 | 40 | 60 | 80 | 100 | 120 | 150 | 200 |
| A | 1 | 1 | 1 | 4 | 4 | 6 | 7 | 7 | 8 | — | — |
| B | 1 | 1 | 1 | 1 | 4 | 4 | 6 | 6 | 7 | 7 | 8 |
| C | 1 | 1 | 1 | 2 | 3 | 3 | 5 | 7 | 8 | — | — |
| D | 1 | 1 | 1 | 1 | 2 | 3 | 3 | 7 | 8 | — | — |
| E | 1 | 1 | 1 | 1 | 2 | 3 | 3 | 7 | 7 | 8 | — |
| F | 1 | 1 | 1 | 1 | 1 | 1 | 2 | 3 | 3 | 7 | 7 |
| G | 1 | 1 | 1 | 1 | 3 | 5 | 7 | 7 | 8 | — | — |
| H | 1 | 1 | 1 | 1 | 1 | 2 | 3 | 7 | 7 | 8 | — |

1 = white, 2 = slightly yellow, 3 = yellow, 4 = slightly grey, 5 = orange, 6 = grey, 7 = brown, 8 = black

TABLE II

Results of the evaluation of light stability

| Composition | Time (hours) | | | | | |
|---|---|---|---|---|---|---|
| | 0 | 500 | 1000 | 1500 | 2000 | 4000 |
| A | 1 | 1 | 1 | 1 | 3 | 5 |
| B | 1 | 1 | 1 | 1 | 1 | 4 |
| C | 1 | 1 | 1 | 1 | 2 | 4 |
| D | 1 | 1 | 1 | 1 | 1 | 4 |
| E | 1 | 1 | 1 | 1 | 1 | 4 |
| F | 1 | 1 | 1 | 1 | 1 | 4 |
| G | 1 | 1 | 1 | 1 | 3 | 5 |
| H | 1 | 1 | 1 | 1 | 1 | 3 |

1 = white, 2 = slightly yellow; 3 = slightly grey, 4 = yellow, 5 = grey, 6 = brown

EXAMPLE 5

| | Parts by weight | | | | |
|---|---|---|---|---|---|
| | I | J | K | L | M |
| PVC (K 68) | 100 | 100 | 100 | 100 | 100 |
| Chalk | 6 | 6 | 6 | 6 | 6 |
| $TiO_2$ | 3 | 3 | 3 | 3 | 3 |
| Distearyl phthalate | 0.5 | 0.5 | 0.5 | 0.5 | 0.5 |
| Bisphenol A | 0.2 | 0.2 | 0.2 | 0.2 | 0.2 |
| Zinc stearate | 0.7 | 0.7 | 0.7 | 0.7 | 0.7 |
| Calcium stearate | 0.7 | 0.7 | 0.7 | 0.7 | 0.7 |
| $Ca_6Al_2(OH)_{14}-(HPO_3)_2\cdot 4H_2O$ | 3.0 | 3.0 | 3.0 | 3.0 | 3.0 |
| Pentaerythritol | — | 0.3 | — | — | — |
| Epoxidized soybean oil | — | — | 1.0 | — | — |
| Ethyl aminocrotonate | — | — | — | 0.3 | — |
| Dibenzoyl methane | — | — | — | — | 0.1 |

The aforementioned compositions of I to M were produced and tested according to the indicated methods. The results are indicated in tables III and IV.

TABLE III

Results of the evaluation of the thermal stability

| Composition | Time (min.) | | | | | | | | | | |
|---|---|---|---|---|---|---|---|---|---|---|---|
| | 0 | 10 | 20 | 30 | 40 | 60 | 80 | 100 | 120 | 150 | 200 |
| I | 1 | 1 | 1 | 2 | 3 | 3 | 5 | 6 | — | — | — |
| J | 1 | 1 | 2 | 2 | 3 | 4 | 4 | 5 | 6 | — | — |
| K | 1 | 1 | 1 | 1 | 2 | 3 | 3 | 3 | 5 | 6 | — |
| L | 1 | 1 | 1 | 1 | 1 | 2 | 6 | — | — | — | — |
| M | 1 | 1 | 1 | 1 | 1 | 3 | 3 | 3 | 4 | 6 | 6 |

1 = white, 2 = slightly yellow, 3 = yellow, 4 = orange, 5 = brown, 6 = black

TABLE IV

Results of the initial colour

| Composition | Visual estimate |
|---|---|
| I | Satisfactory |
| J | Sufficient |
| K | Good |
| L | Very good |
| M | Very good |

EXAMPLE 6

| | Parts by weight | | | |
|---|---|---|---|---|
| | N | O | P | R |
| PVC K 70 | 100 | 100 | 100 | 100 |
| Diisodecyl phthalate | 50 | 50 | 50 | 50 |
| Chalk | 40 | 40 | 40 | 40 |
| Lead stearate | 0.7 | — | — | — |
| 2-basic lead phosphite | 2.0 | — | — | — |
| Zinc stearate | — | 0.5 | 0.5 | 0.5 |
| Calcium stearate | — | 0.7 | 0.7 | 0.7 |
| $Ca_3Al_2(OH)_{11}-(HPO_3)_{0.5}\cdot 3H_2O$ | — | 2.5 | — | — |
| $Ca_6Al_2(OH)_{14}-(HPO_3)_{2.0}\cdot 4H_2O$ | — | — | 2.5 | — |

|  | Parts by weight | | | |
| --- | --- | --- | --- | --- |
|  | N | O | P | R |
| Ca$_8$Al$_2$(OH)$_9$—(HPO$_3$)$_{6.5}$·3H$_2$O | — | — | — | 2.5 |

The aforementioned compositions of N to R were produced according to the indicated method, and the thermal stability was assessed. The results are summarized in table V.

TABLE V

| Composition | Time (min.) | | | | | | | | | | |
| --- | --- | --- | --- | --- | --- | --- | --- | --- | --- | --- | --- |
|  | 0 | 10 | 20 | 40 | 60 | 80 | 120 | 160 | 180 | 200 | 220 |
| N | 1 | 1 | 1 | 2 | 2 | 2 | 2 | 3 | 3 | 3 | 4 |
| O | 1 | 1 | 1 | 2 | 2 | 2 | 3 | 3 | 3 | 4 | — |
| P | 1 | 1 | 1 | 1 | 1 | 2 | 2 | 2 | 3 | 3 | 4 |
| R | 1 | 1 | 1 | 1 | 2 | 2 | 3 | 4 | — | — | — |

1 = white, 2 = yellow, 3 = brown, 4 = black

We claim:

1. A basic calcium aluminum hydroxy phosphite compound represented by the general formula:

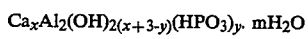

wherein
x is 3 to 12;

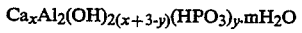

with the proviso that y≠1 if x=3 to 8; and
m is 0 to 12.

2. The compound according to claim 1, wherein x is 3 to 8.

3. The compound according to claim 1, wherein x is 3 to 6.

4. The compound according to claim 1 or wherein m is 2 to 4.

5. A process for stabilizing polymers comprising adding a stabilizing effective amount of the compound of claim 1 to a halogen-containing polymer.

6. The process according to claim 5 wherein the halogen-containing polymer is polyvinyl chloride.

7. A process for the production of basic calcium aluminum hydroxy phosphite compounds comprising reacting a mixture of calcium hydroxide and/or oxide, aluminum hydroxide and sodium hydroxide or of calcium hydroxide and/or oxide and sodium aluminate with phosphorous acid in amounts corresponding to those required to produce basic calcium aluminum hydroxy phosphite compounds having the general formula:

Ca$_x$Al$_2$(OH)$_{2(x+3-y)}$(HPO$_3$)$_y$·mH$_2$O wherein x is 3 to 12; ((2x+5)/2 )>y >0 with the proviso that y≠1 if x=3 to 8; and m is 0 to 12, in an aqueous medium, and separating and recovering said basic calcium aluminum phosphite compounds.

8. A process according to claim 7, characterized in that the reaction is carried out at a temperature between about 50° and 100° C.

* * * * *

UNITED STATES PATENT AND TRADEMARK OFFICE
CERTIFICATE OF CORRECTION

PATENT NO. : 5,356,982
DATED : October 18, 1994
INVENTOR(S) : Coriolan Razvan, et al.

It is certified that error appears in the above-indentified patent and that said Letters Patent is hereby corrected as shown below:

Column 1, line 68: "$mH_2$)" should read --$mH_2O$--

Column 8, line 11, Claim 4: delete "or"

Signed and Sealed this

Sixth Day of June, 1995

*Attest:*

BRUCE LEHMAN

*Attesting Officer*   *Commissioner of Patents and Trademarks*